United States Patent
Bauer et al.

(10) Patent No.: US 7,600,033 B2
(45) Date of Patent: Oct. 6, 2009

(54) NETWORK TRAFFIC CONTROL IN PEER-TO-PEER ENVIRONMENTS

(75) Inventors: Daniel N. Bauer, Birmensdorf (CH); John G. Rooney, Zurich (CH); Paolo Scotton, Horgen (CH); Marcel Waldvogel, Stein am Rhein (CH)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 10/535,123

(22) PCT Filed: Oct. 28, 2003

(86) PCT No.: PCT/IB03/04800

§ 371 (c)(1),
(2), (4) Date: Nov. 28, 2005

(87) PCT Pub. No.: WO2004/047408

PCT Pub. Date: Jun. 3, 2004

(65) Prior Publication Data

US 2006/0168304 A1     Jul. 27, 2006

(30) Foreign Application Priority Data

Nov. 15, 2002  (EP) .................................. 02025751

(51) Int. Cl.
*G06F 15/16* (2006.01)

(52) U.S. Cl. .................. 709/232; 370/469; 370/254; 370/230.1; 370/252; 379/70; 379/49; 379/88.24

(58) Field of Classification Search ................. 709/227, 709/228, 229, 230, 231, 232
See application file for complete search history.

(56) References Cited

U.S. PATENT DOCUMENTS

| 7,120,792 | B1 * | 10/2006 | Jacobson et al. ............ 713/153 |
| 7,428,590 | B2 * | 9/2008 | Miller et al. ................. 709/225 |
| 2002/0199012 | A1 * | 12/2002 | Cable et al. .................. 709/233 |
| 2003/0004822 | A1 * | 1/2003 | Shorter et al. ................. 705/26 |
| 2007/0064702 | A1 * | 3/2007 | Bates et al. ................... 370/392 |

OTHER PUBLICATIONS http://www.mikrotik.com/testdocs/ros/2.8/ip/peer2peer.pdf Sep. 16, 2004 vol. 2.8 "Peer to Peer Traffic control".*
http://www.cisco.com/en/US/prod/collateral/vpndevc/ps6032/ps6094/ps6120/at_a_glance_c45-530437.pdf "Cisco ASA Bonet Traffic Filter".*

* cited by examiner

*Primary Examiner*—Thuha T. Nguyen
*Assistant Examiner*—Randy Scott
(74) *Attorney, Agent, or Firm*—Vazken Alexanian

(57) ABSTRACT

A method and an electronic unit are disclosed for controlling traffic on a network, especially for controlling peer-to-peer related traffic. A filter unit is intercepting messages related to peer-to-peer application from a network line, irrespective of the messages' destination, A control logic then manages a request represented by an intercepted message subject to its content and subject to peering specific information.

1 Claim, 9 Drawing Sheets

NETWORK TRAFFIC CONTROL IN PEER-TO-PEER ENVIRONMENTS

CROSS REFERENCE AND PRIORITY

This application filed under 35 USC 371, is cross-referenced with, and claims priority from, International Patent Application PCT/IB2003/004800 filed on Oct. 28, 2003, and published in English with Publication No. WO2004/047408 published on Jun. 3, 2004, under PCT article 21(2), which in turn claims priority of EP02025751.5, filed on Nov. 15, 2002.

TECHNICAL FIELD

The present invention relates to a network traffic control unit, a network comprising such a network traffic control unit, a method for controlling traffic on a network, and to a corresponding computer program product.

BACKGROUND OF THE INVENTION

Peer-to-peer applications become more and more popular since a wide range of data stored on computers on the edge of the Internet can now be accessed. Computers that stored and provided data only for local access and in addition provided means for retrieving data from Internet servers may serve today as a data base for other computers and simultaneously may receive data not only from Internet servers but also from other remote computers when executing peer-to-peer applications. This widens the pool of accessible data tremendously.

Below, the term peer or node or peer node is used for an electronic device—for example a computer, a workstation or a PDA (personal digital assistant) but not limited to—that can run a peer-to-peer application. Therefore, such node should be able to access a network in order to exchange information with other nodes.

Gnutella is currently one of the most prominent representative of unstructured peer-to-peer applications, see "The Gnutella Protocol Specification v0.4 Document Revision 1.2", retrieved on the Internet http://www9.limewire.com/developer/gutella protocol 0.4.pdf and accessed Nov. 15, 2002. These applications are called unstructured as nodes peer with other nodes in a random fashion. Searching in unstructured peer-to-peer network essentially is a random probing as resources such as files or other services are made available on arbitrary nodes in the network, see "Search and Replication in Unstructured Peer-to-Peer Networks", Qin Lv et al., in 16th ACM International Conference on Supercomputing, June 2002. The main advantages of these systems are their simplicity, for example the protocols used are very simple, and their dynamics in a sense that nodes can appear and disappear at a high rate. Another advantage is that search queries can be almost arbitrary complex and includes keyword-searching, substring-matching etc.

Peer-to-peer applications that include file exchange protocols—like Gnutella—Gnu V0.4 dynamically establish an "overlay" network to exchange information. When a peer is started, it tries to peer with other peers using a request/accept protocol. The requesting peer sends a "connect request" to another peer node. If this other peer authorizes the connection it answers with a "connect accept" and the two parties establish a adjacency. Then they can start exchanging information that get passed on to other peers.

FIG. 1 illustrates the way connectivity is achieved within an exemplary network comprising at least two peer groups 1 and 2—also called clusters. Each peer group 1 or 2 comprises peer nodes A, B, C, respectively D and E. Reference 3 indicates some physical interconnection (wire-bound, wireless) between peer groups 1 and 2. Arrows indicate an already established peering connection which is rather a logical interconnection than a physical interconnection. Such connection is established by having one of the peers send a connect request message to the other peer and the other peer having accepted this connect request message with an accept message according to the protocol of the peer-to-peer application.

In FIG. 1a), node C is peered with nodes A and B, as well as node D is peered with node E. Nodes C and D are prone to peering as C gets to know about D. Therefore C sends a connect request to D and D accepts by sending an accept message back to C.

According FIG. 1b), C and D are now peered and C relays messages to D, the messages issued by A and B, whereas D relays messages to C, the messages issued by E. In the following, A and D would like to peer as A gets to know about D. Therefore A sends a connect request to D and D accepts by sending an accept message back to A.

According to FIG. 1c), A and D are now peered in addition to the already existing peering connections. However, there are now two logical peering connections existing on the physical interconnecting link 3. These two logical connections were established by means of at least four messages crossing the interconnection 3.

This overlay network—that is a term for the network of logical connections—is an ad-hoc network that does not rely on an infrastructure. One well-known problem is how to bootstrap the peering mechanism, that is how a peer can find addresses of other peers to peer with. Usually two types of techniques are used to solve this problem. One solution consists of the peer connecting to a server located at a well-known address. This server maintains a list of peers' addresses that are communicated to the peer. Another solution is for the peer to maintain itself a list of other peer it peered with and use addresses from this list.

In account of the technique, peering is done based on a list of addresses without taking into the actual network infrastructure or the affinity between peers. Therefore the resulting overlay network is typically totally de-correlated from the physical network. This can lead to a very inefficient use of the network resources and poor performances of the file search protocol using this network.

Another example shown in FIG. 2 demonstrates an example how a physical network is flooded with peer-to-peer application messages in order to establish adjacencies between peer nodes. Three clusters 1, 2, 4 are shown. Big circles represent physical network nodes (e.g. routers, gateways), whereas small circles represent peer nodes. Dotted lines represent physical interconnections between physical network nodes, whereas straight lines represent logical interconnections between peer nodes. As can be derived from FIG. 2, peer node A is communicating with peer node F only via peer nodes B to E, while they are adjacent in the physical network. Note that in this example links joining cluster 1 to cluster 2 and cluster 1 to cluster 3 will easily get congested.

Structure of peer-to-peer applications thus result in a limited scalability due to brute-force flooding and a clear misfit of the overlay network topology with the underlying Internet topology representing the physical connections.

Flooding the underlying physical network with messages is not only a problem when looking for other peers to peer with but also when querying for information, such as data files, once an overlay network is established.

FIG. 3 introduces such exemplary query process according to the protocol of a peer-to-peer application: FIG. 3a) is similar to FIG. 1a) and shows the establishment of a peering connection between nodes C and D.

According to FIG. 3b), node A now issues a query request "Looking for vivaldi.mp3". C forwards this query request to B and D, D forwards this request to D. Arrows between two peer nodes pointing only in one direction indicate the transmitted query requests.

E is supposed to have what A is looking for, so E sends a confirmation message to D, see FIG. 3c). D knows that the confirmation is related to a request coming from C so sends the confirmation message to C. C knows that the confirmation message is related to a request coming from A so sends the confirmation message to A. Then, A contacts E using other means, e.g. HTTP, to get the file.

EP 1 229 442 A2 discloses a peer-to-peer protocol that is meant to be uniform fro many different peer-to-peer applications. There are different layers defined, such as a platform core layer, a platform services layer, and a platform application layer. Socalled rendezvous peers can maintain dynamic indexes for entities in the peer-to-peer platform including peers or peer groups. Rendezvous peers are considered to be peers executing additional functions.

"Idebtifying and Controlling P2P/File-Saring Applications", retrieved from the Internet http://www.allot.com/html/solutions notes kazaa.shtm and accessed Oct. 17, 2002, "Packeteer: Another take on limiting P2P traffic", by Ann Harrison, retrieved from the Internet http://www.nwfusion.com/newsletters/fileshare/2002/01297785.html and accessed Oct. 17, 2002, "Four Steps to Application Performance across the Network", by Packeteer/TM Inc., retrieved from the Internet http://www.packeteer.de and accessed Oct. 17, 2002, each disclose a device that detects and identifies different types of traffic. In a second step, network and application behaviour—especially bandwidth consumption—is analyzed. According to the analysis, bandwidth is allocated to different applications.

EP 1 075 112 A1 describes a PNNI hierarchical network, whereby one of the peers represents a peer group as a peer group leader. The peer group leader has a memory for storing peer group topology data.

Several approaches to limit peer-to-peer traffic were introduced that are highly structured: "A scalable Content-Addressable Network", by S. Ratnasamy et al., in ACM SIGCOMM, pages 161-172, August 2001; "Pastry: Scalable, decentralized object location and routing for large-scale peer-to-peer systems", by A. Rowstron and P. Druschel, in IFIP/ACM International Conference on Distributed Systems Platforms (Middleware), pages 329-350, November 2001; "Chord: A scalable Peer-to-peer Lookup Service for Internet Applications", by I. Stoica et al., in Proceedings of the 2001 ACM SIGCOMM Conference, pages 149-160, August 2001. These approaches tightly control how and on which nodes information is stored. Also, peering of nodes is not random and the resulting overlay networks are often congruent to the underlying Internet topology. The disadvantage is that these approaches do not cope well with very high dynamics, i.e. a rapidly changing user population makes these systems unstable. Furthermore, these systems excel in exact-match queries but have some weaknesses in key-word based queries and substring queries.

Therefore, it is desired to have network traffic controlling means provided while having peers causing such traffic remaining unchanged.

SUMMARY OF THE INVENTION

According to one aspect of the invention, there is provided a network traffic control unit, comprising a filter unit for intercepting messages from a network line. Messages are intercepted relating to peer-to-peer application irrespective of the destination of a message. There is further provided a control logic that is configured for managing a request represented by an intercepted message, subject to its content and subject to peering specific knowledge the network traffic control unit provides.

According to another aspect of the invention there is provided a method for controlling traffic on a network, comprising receiving messages relating to peer-to-peer application, intercepted by a filter unit from a network line, irrespective of the messages' destination, and managing a request represented by an intercepted message, subject to its content and subject to peering specific information.

The filter unit filters messages that indicate in one way or another that they are peer-to-peer application related. Peer-to-peer applications typically enable user computers to act as both client and server for data files or services to other user computers. In a preferred embodiment, the filter unit is checking port fields of TCP messages with regard to appearance of defined port numbers in designated port fields that indicate peer-to-peer application. A peer-to-peer application might use a port number to be identified that is different to the port number of other peer-to-peer applications, and different to port numbers of other non peer-to-peer applications. However, other significant information of a message might be used to filter peer-to-peer application related messages. The network traffic control unit and its filter unit might be prepared to filter and then to control only messages related to a certain peer-to-peer application or might be prepared to filter and then to control messages of different known peer-to-peer applications. Messages not relating to a peer-to-peer application are typically not affected and can pass the filter unit unhamperedly.

The filter unit thus intercepts peer-to-peer application traffic on a network line irrespective of the destination of the messages. The traffic that is filtered is thus not directed to the IP or whatever address of the network traffic control unit but typically addressed to peer destinations. Nevertheless, the network traffic control unit is intercepting this kind of traffic in order to get control on it.

In order to achieve extended control on peer-to-peer traffic on a network, it is considered to be preferred to give the network traffic control unit access to a network line that is carrying large amounts of such traffic. A preferred network line to be accessed by the filter unit is an ingress/egress line to a group or cluster of peers, such that all or most of network traffic to or from peers of this clusters has to pass this network line and can be monitored.

On a lower level of a hierarchical communication layer, a message is represented by one or more data packets as indicated above when talking about TCP protocol. Other protocols of course may be used instead. The filter unit might be embodied as packet filtering logic implemented on a network processor. Since the network traffic control unit and the associated proposed method have to primarily manage requests from peers, it is in particular appreciated to detect such requests. This detection can be implemented by the filter unit: For example, a request might be expressed in the corresponding data packet with a defined code in a designated field of the data packet. Then, the filter unit can be prepared to check this field for a given number of codes representing a request. Other peer-to-peer application messages may also be filtered but treated differently from a management point of view than requests. Alternatively, messages comprising peer-to-peer application requests might be detected by intercepting peer-to-peer application messages by means of the filter unit and having a command field of such messages analyzed by the control logic.

The control logic may be implemented in hardware or software or a combination thereof, or any other suitable implementation. A task that is assigned to the control logic is to manage requests that are intercepted. Managing comprises, that such requests are now handled by the control logic in a way that might be different to the way the request pertaining peer-to-peer application envisages, but also satisfies the requesting peer, thereby preferably causing less traffic on the network than the peer-to-peer application would cause. The network traffic control unit therefore might preferably set up new messages, redirect requests, interact with the requesting peer or peers intercepted messages are addressed to or even other network traffic control units. These are only some actions a network traffic control unit could provide, but not necessarily has to provide all of them. The opportunities for managing requests are on the other hand not limited to the enumerated actions.

Basically the control logic discovers the content of such intercepted message and coordinates measures to satisfy the needs expressed by such message dependent on the content of the message and dependent on knowledge the network control unit has, either stored in a memory or by way of accessing other sources of knowledge. This knowledge is peering specific knowledge that helps in taking measures to satisfy queries, connect requests or other requests more efficiently. Typically, peers by themselves do not have this knowledge available.

Thus, the invention allows the dramatic reduction of network traffic caused by peer-to-peer applications by installing a network traffic control unit that takes the lead in managing requests intercepted from a network line. Adding such smart control creates benefits in controlling and limiting peer-to-peer application initiated traffic. This can be achieved without changing or amending neither participating peers nor the network structure and even without making the introduction of such a network traffic control unit public with the peers or other entities within the network. The topology of the peer-to-peer overlay network is enhanced. Network control units can be added or removed without any requiring any changes to the peers.

The network traffic control unit can a stand alone electronic device in one preferred embodiment. In another preferred embodiment, the functions of the network traffic control are added to the functions of a router, such that only one device is responsible for both, router and traffic control functions.

According to many of the preferred embodiments introduced below, the control logic is sending messages in order to manage requests. This has to be interpreted such that the control logic primarily decides on sending messages, while the physical transmission of messages is initiated by an interface that is controlled by the control logic.

In a preferred embodiment, the intercepted message is dropped. This step is performed after having the content of the message evaluated. Dropping the intercepted message expresses that the control logic takes control for further managing and thinking about new ways to handle the request. This is a first traffic limiting effort.

Preferably, a request to be managed is a connect request issued from a peer node and directed to another peer node. Such connect request is sent in order to establish a connection to another peer, that may provide the contacting peer with the information or service the contacting peer looks for after it accepted such connect request. It is important to have connect requests handled by the control logic of the network traffic control unit, since such connect requests might cause many other succeeding connect requests between other peers, for example when the peer-to-peer application determines to have a connected peer send connect requests to other peers he is aware of. By managing such connect requests and thus controlling actions for satisfying these requests, the flood of peer-to-peer traffic can be contained dramatically.

A preferred way to manage a connect request is to handle further actions with regard to already existing connections the network traffic control unit is involved in. Whenever a peer is requesting connectivity to a another peer, and the requesting peer is already connected to a third peer, preferably of the same remote cluster, the network traffic control unit might desist from sending a new request to this cluster, especially when it is aware that the other peer is already connected to the requesting peer via the third peer.

In a preferred embodiment, the network traffic control unit therefore provides peering specific knowledge information on peer-to-peer connections the network traffic control unit is currently aware of.

As indicated above, preferably no message might be sent to the addressee of the intercepted connect request when a connection is already established that can serve the requesting peer node.

In another preferred embodiment, the control logic initiates sending a connect request to the originator of the intercepted connect request in response to the intercepted connect request. This is to fully get control on the handling of the intercepted connect request. The network traffic control unit sends this connect request with its own ID as originator. In the following, the requesting peer exclusively communicates to the network traffic control unit. Traffic can be controlled and limited effectively.

Where appropriate, the network traffic control unit sends a connect request with its own ID as originator to the addressee of the intercepted connect request. This might be reasonable in order to satisfy the needs of the requesting peer as long as there is no other connection established in particular to this peer or in general to this cluster. When there is a connection to another peer of this remote cluster, the network traffic control unit might prefer using the existing connection to reach the requested peer instead of fulfilling the original request to connect.

In another preferred embodiment, the network traffic control unit sends a connect request to the addressee of the intercepted connect request, thereby pretending the originator of the intercepted connect request is sending the connect request. This is an alternative method of controlling the establishment of connections, when the network traffic control unit is not appearing under its own identity.

It may be preferred, sending a connect request to a peer node other than the addressee of the intercepted connect request in response to the intercepted connect request. This other peer node might support establishing a connection to the requesting peer node. There might be different reasons and strategies, when a connect request is redirected by the network traffic control unit. Typically, the network traffic control unit acts under its own identity when redirecting a connect request.

Especially when a connect request is directed to a peer of another remote cluster and another network traffic control unit is allocated to this cluster, it is preferred that the local network traffic control unit exclusively "talks" to peers of the other clusters via the remote network traffic control unit. This limits traffic drastically. Such a connect request to another network traffic control unit might also be advantageous in order to receive peering specific information the other network traffic control unit provides in preparation of connecting peers of the remote cluster.

When the network traffic control unit is intercepting a connect request and acting in the following under its own identity, further actions might be preferably initiated only after the originator of the intercepted connect request accepts the connect request that is sent to him from the network traffic control unit. This prevents generating traffic, when the originator is not prepared to communicate with the network traffic control unit.

Especially for managing connect requests described above, the network traffic control logic is preferably prepared to communicate according to a protocol of the peer-to-peer application.

Other requests that are preferably handled by the network traffic control unit are data file queries issued by a peer node and brought to the attention of the network traffic control unit by way of filtering. These query requests cause lots of succeeding traffic either, such that effective management of handling such requests is vital for reducing overall peer-to-peer induced traffic on the network. Typically, a query request is sent after peers are connected in order to figure out which of these online peers can provide the information the querying peer is looking for.

In a preferred embodiment, managing such a query request is subject to an index that allocates keys representing data files for download or representing services to network traffic control units. This index is considered as peering specific knowledge. A key specifies at least a part of the content of a certain query and is generated from the content of the respective query request according to fixed rules that the control logic preferably implements. Having such a key derived from the query request, the network traffic control unit derives from this index, which network traffic control unit among some or many network traffic control units is responsible for administering information on this key. This information then maps peer nodes to keys. The mapped peer nodes are currently registered for providing a file the key stands for.

In a preferred embodiment of the invention, the peering specific knowledge a network traffic control unit provides comprises an index that allocates keys representing data files for download to network traffic control units. This index is preferably locally stored in every network traffic control unit and distributed regularly, respectively updated on a regular or event driven basis. Every network traffic control unit is responsible for administering information related to a number of keys. As keys in the end represent information on queries and especially on queried data files, every network traffic control unit administers information on a number of different data files. Such information, collected in another index then allocates peer nodes to keys, giving thus detailed information which peer actually can provide a certain data file.

Since looking for a file or a service can be expressed in queries in many different ways by different strings, the search strings of query requests are not very suitable for executing the query request immediately. Therefore, it is preferred, that one or more keys are derived from the content of the query request—that is particularly a string. The underlying set of rules is preferably stored by the network traffic control unit; its control logic is configured for implementing such rules for deriving keys from query requests.

When such key or keys are derived from a query string by means of the control logic, and when a network traffic control unit that administers the keys is found by screening the corresponding index, a request is directed to one or more remote network traffic control units that are allocated to the derived keys in order to obtain information which peers have the files represented by the keys available. The requested network traffic control unit or units preferably send such information back to the requesting network traffic control unit. A hit message from the network traffic control unit to the querying peer node might then be preferred for having the peer node select any number of data files offered. Many preferred variations of this process are introduced later on.

Some network traffic control units therefore provide preferably a key—peer node index for some keys. These network traffic control units provide other network traffic control units with the knowledge which peer nodes are allocated to a requested key according to the key—peer node index. Administration tasks of such a network traffic control unit preferably include updating the index by adding and removing entries.

In another preferred embodiment, a way of updating indexes of peering specific knowledge is introduced: Hit messages sent from a peer node associated to the network traffic control unit are monitored. One or more keys are derived from the content of a hit message. The sending peer node is allocated to the derived keys, and the key—peer node relation is stored in the key—peer node index at the network traffic control unit that administers the index the key is part of. This method helps to keep peering specific knowledge up-to-date.

Preferably, such advanced search including underlying communication between network traffic control unit as well as administering indexes, tables or other peering specific knowledge is accomplished using a protocol different to the peer-to-peer application protocol.

Such protocol is more efficient and addresses the above mentioned purposes. This protocol is specifically used for managing query requests.

For many purposes, it is preferred to have peering specific knowledge available that comprises information on peer nodes associated to the network traffic control unit. This helps optimizing managing efforts as peer nodes of a joint cluster are typically located close to each other. Such distance information might affect managing requests by the network traffic control unit.

According to another aspect of the invention, there is provided a network comprising at least one group of peer nodes, a network line serving as ingress/egress line for this peer group, and a network traffic control unit according to any one of claims referring to such unit.

According to another aspect of the invention, there is provided a computer program element comprising computer program code which, when loaded in a processor unit of a network traffic control unit, configures the processor unit for performing a method as claimed in any one of the method claims.

Advantages of the different aspects of the invention and their embodiments go along with the advantages of the inventive network traffic control unit and method described above.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

Different figures may contain identical references, representing elements with similar or uniform content.

DETAILED DESCRIPTION OF THE DRAWINGS

Figure 4:
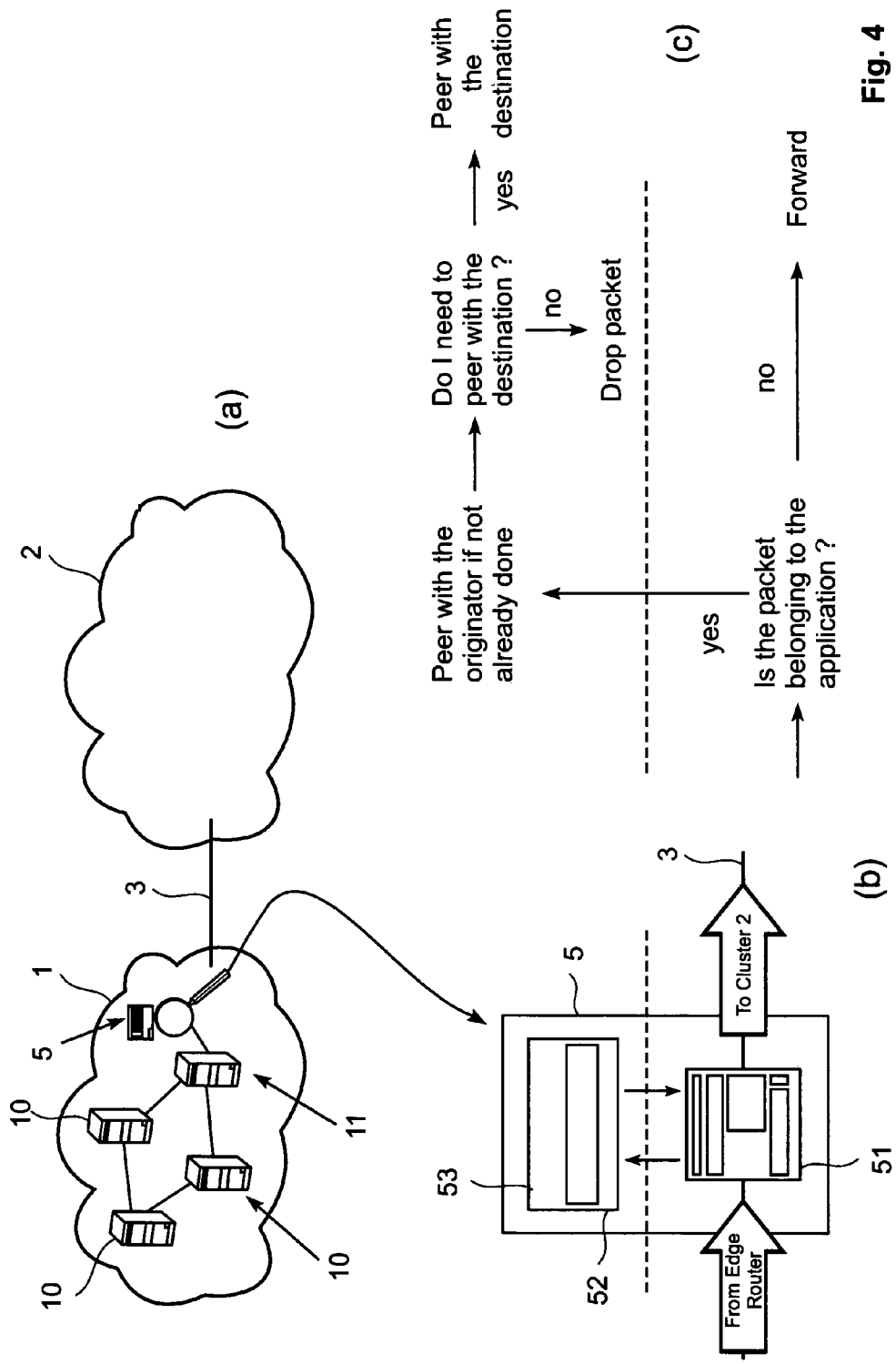

FIG. 4 shows embodiments of different aspects of the present invention. FIG. 4a) illustrates a chart of a network in accordance with an embodiment of the present invention, FIG. 4 b) a block diagram of a network traffic control unit in accordance with an embodiment of the present invention, and FIG. 4 c) a flow chart of a method of controlling traffic in accordance with an embodiment of the present invention.

FIG. 4 a) shows two clusters 1 and 2. The clusters 1 and 2 are physically connected via an interconnection 3. Cluster 1 comprises some routers 10 and an edge router 11 being the router that is directly connected to the interconnection line 3—also called network line 3. Neither are shown the peers belonging to each clusters nor any logical connections between peers.

A network traffic control unit 5—also called booster—is introduced in the network co-located with the network ingress/egress node—that is the edge router 11—, in order to control at least a large part of the traffic the cluster 1 is transmitting and receiving. This traffic is present on the network line 3.

FIG. 4b) shows a block diagram of the network traffic control unit 5. The network traffic control unit 5 comprises a filter unit 51, being implemented in a network processor. The filter unit 51 is monitoring the network line 3 and filters all messages on this network line 3 that relate to peer-to-peer applications. Other messages—respectively the corresponding data packets—are not affected and take their way to destination on network line 3. The network traffic control unit 5 further comprises a control logic 52 that receives intercepted messages and also has capability to send respectively initiate sending messages over the network line 3. A memory 53 is provided for storing peering specific knowledge the control logic has access to.

FIG. 4 c) shows a flow chart of the way the network traffic control unit 5 is having impact on messages that are sent the over network line 3, and especially to messages that represent a connect request sent from a peer of cluster 1. Overall principle here is controlling the establishment of the overlay network topology by the network traffic control unit 5 and thereby enhancing the performances of the protocol.

The basic principle is to intercept peer-to-peer connect requests issued by cluster 1 peers and to force the requesting peer to peer with the network traffic control unit 5. The interception is performed by the filer unit 51. Only the network traffic control unit 5 peers with external peers and if necessary relays protocol message issued by the peers located inside the network cluster 1. Whenever control logic 52 takes the decision that according to the content of the intercepted request—that might be the request from peer X to connect to peer Y—and according to peering specific knowledge—that might be the information, that peer X is already connected to peer Y via another peer of the same cluster—the intercepted packet is dropped and no further action is required. This drastically limits the traffic on the ingress/egress link and allows the protocol to scale.

Figure 5:
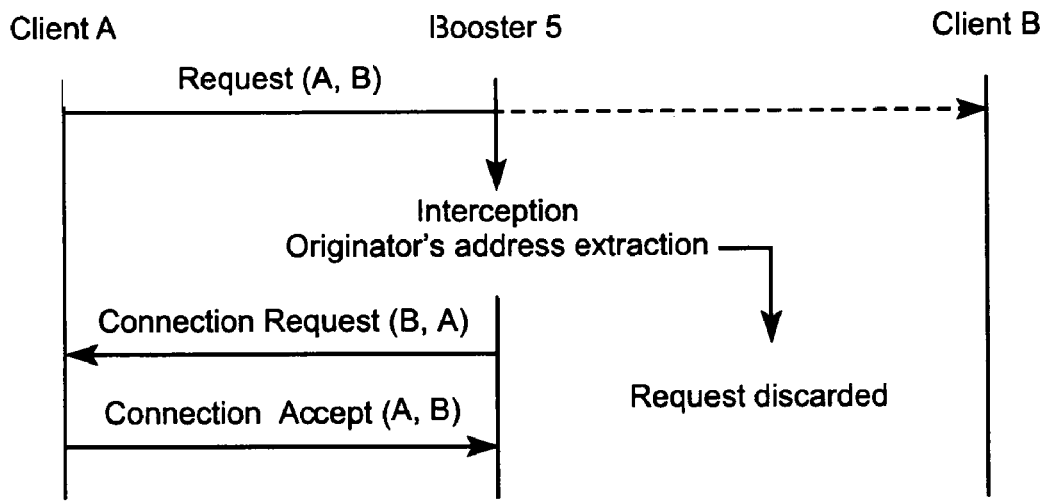

FIG. 5 shows the protocol exchanges leading to the interception of the connect request and how the booster peers with the requested peer. Peer A sends a connect request to peer B. Booster 5 intercepts since a peer-to-peer application message is detected. Originators address, addressee, and content of the message—that is a connect request—are extracted. Then the connect request in dropped. Booster 5 then issues a connect request under its own identity to the peer A who is going to accept it as it is looking for peer nodes.

The booster 5 then might peer with external peers or other boosters. This scheme can be extended using sophisticated information exchanges among boosters to enhance the protocol's performances. For example, summaries of files available in the booster's network can be generated using distributed hash tables (e.g. CAN/Chord or Pastry/Tapestry).

Figure 6:
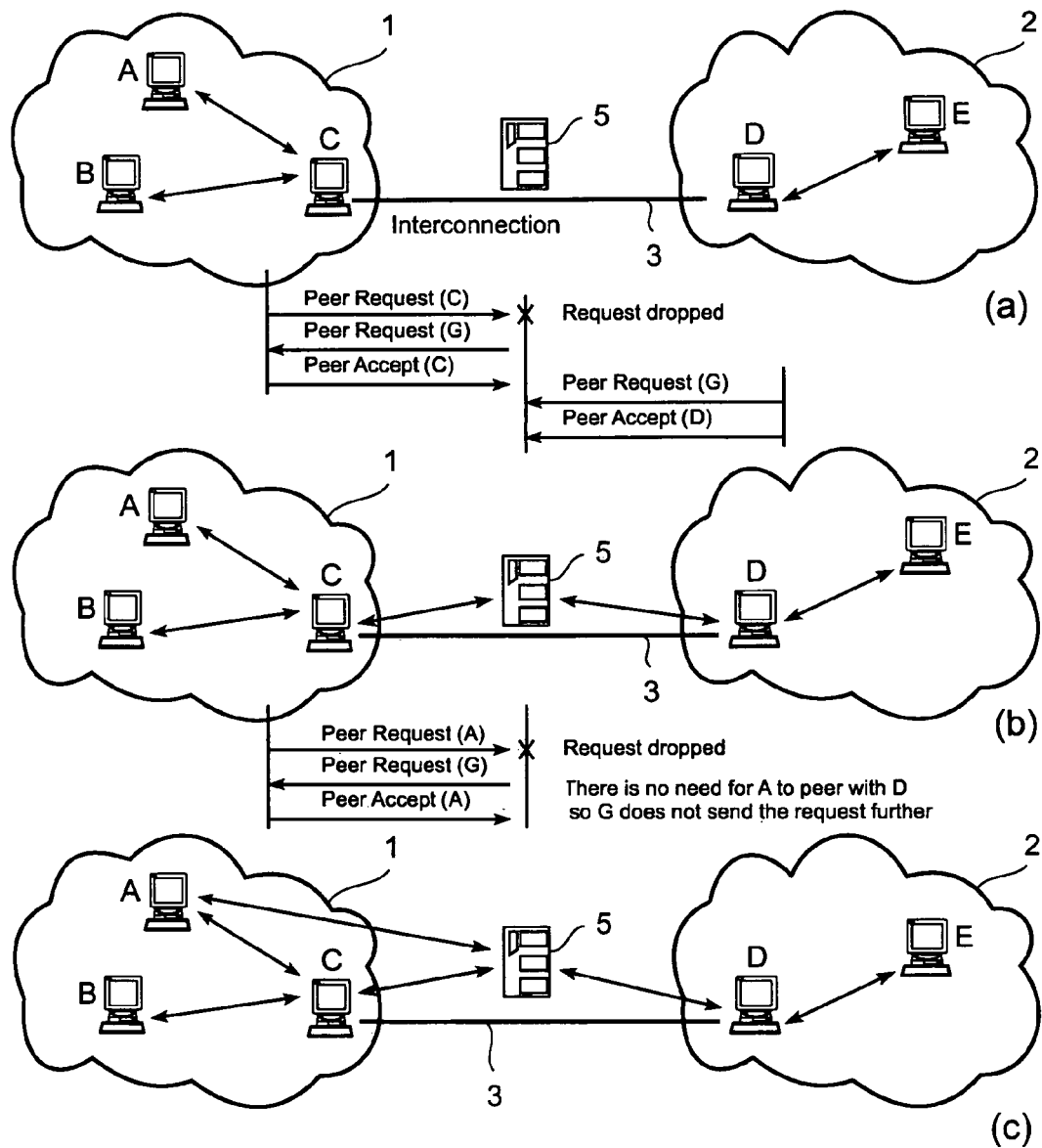

FIG. 6 shows a diagram explaining the way messages are exchanged in accordance with an embodiment of the present invention. It is illustrated how connectivity is achieved within an exemplary network comprising at least two peer groups 1 and 2. Each peer group 1 and 2 comprises peer nodes A, B, C, respectively D and E. Reference 3 indicates a network line between peer groups 1 and 2. Arrows pointing in two directions indicate an already established peering connection which is rather a logical interconnection based on some physical interconnection. Such connection is established by having one of the peers sent a connect request message to the other peer and the other peer having accepted this connect request message with an accept message according to the protocol of the peer-to-peer application.

In FIG. 6a), node C is already peered with nodes A and B, as well as node D is peered with node E. Nodes C and D are prone to peering as C gets to know about D. Therefore C sends a connect request to D. Such messages are indicated by an arrow pointing from the originator to the addressee. In the charts, only the originator of a message is indicated verbally in brackets. But the real message also contains the identification of the addressee.

A network traffic control unit 5 according to an embodiment of the invention is introduced. The identifier of the network traffic control unit 5 is "G". It filters messages of peer-to-peer applications. Thus, the connect request from C to D is intercepted by the network traffic control unit 5. Its information/content is extracted and the request is dropped. Now, network traffic control unit 5 takes full control on managing further actions in response to the intercepted connect request to fulfill the needs of C: It therefore sends a connect request to C. C accepts. According to peering specific knowledge the network traffic control unit 5 has access to, it is still necessary to contact D. Therefore, network traffic control unit 5 sends a connect request to D containing its identifier G. D accepts.

According to FIG. 6b), C and G are peered now as well as G and D are. Now A and D would like to peer as A gets to know about D. Therefore A sends a connect request to D that is intercepted by G=network traffic control unit 5. The request is dropped after extracting the message's content. G sends a connect request to A. A accepts.

There is no need for establishing a further logical connection between A and D since C is already connected to D and A is connected to C. Thus, the network traffic control unit 5 takes no further action and in particular does not send the connect request from A further or contacts D another time. According to FIG. 6c), there is no further connection between A and D, or G and D as a result. Thus, traffic is limited.

Figure 7:
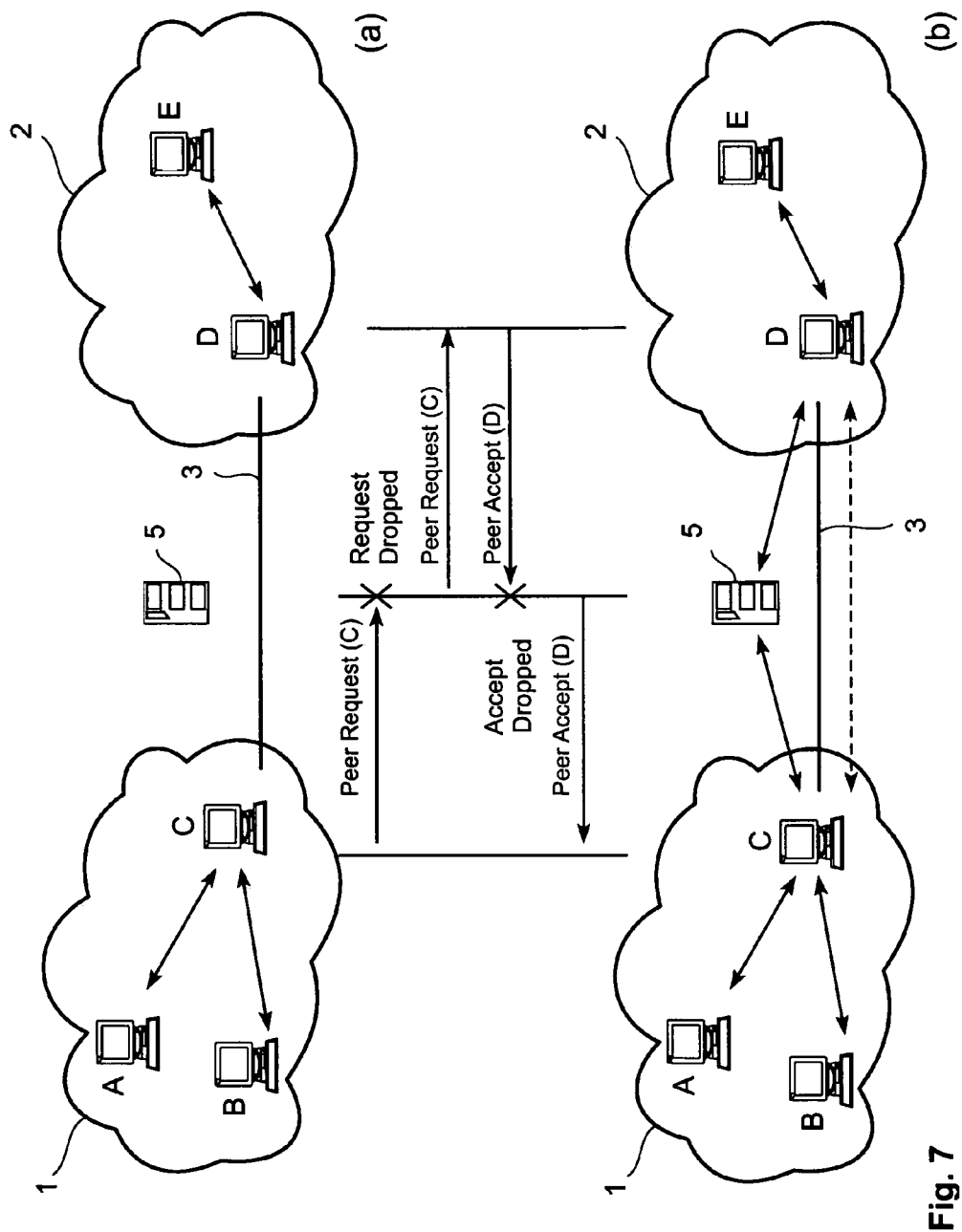

FIG. 7 shows basically an alternative to FIG. 5 with regard to the way messages are exchanged. FIG. 7 illustrates the same network with the same elements as FIG. 6. The way the network traffic control unit 5 manages intercepted connect requests is now different: The network traffic control unit 5 does not appear under its own identity but manipulates in a more hidden way. Connect requests are still intercepted and dropped. After having evaluated peering specific knowledge and the content of the message, it might still be reasonable for network traffic control unit 5 to contact D. But now, D is approached with a connect requests that looks like the original one sent by C, showing C as originator instead of G. The accept message from D is also intercepted and an identical accept message is forwarded to C by the network traffic control unit 5. This method is shown in FIG. 7a). FIG. 7 b) illustrates the actual connections of the overlay network afterwards.

Figure 1:
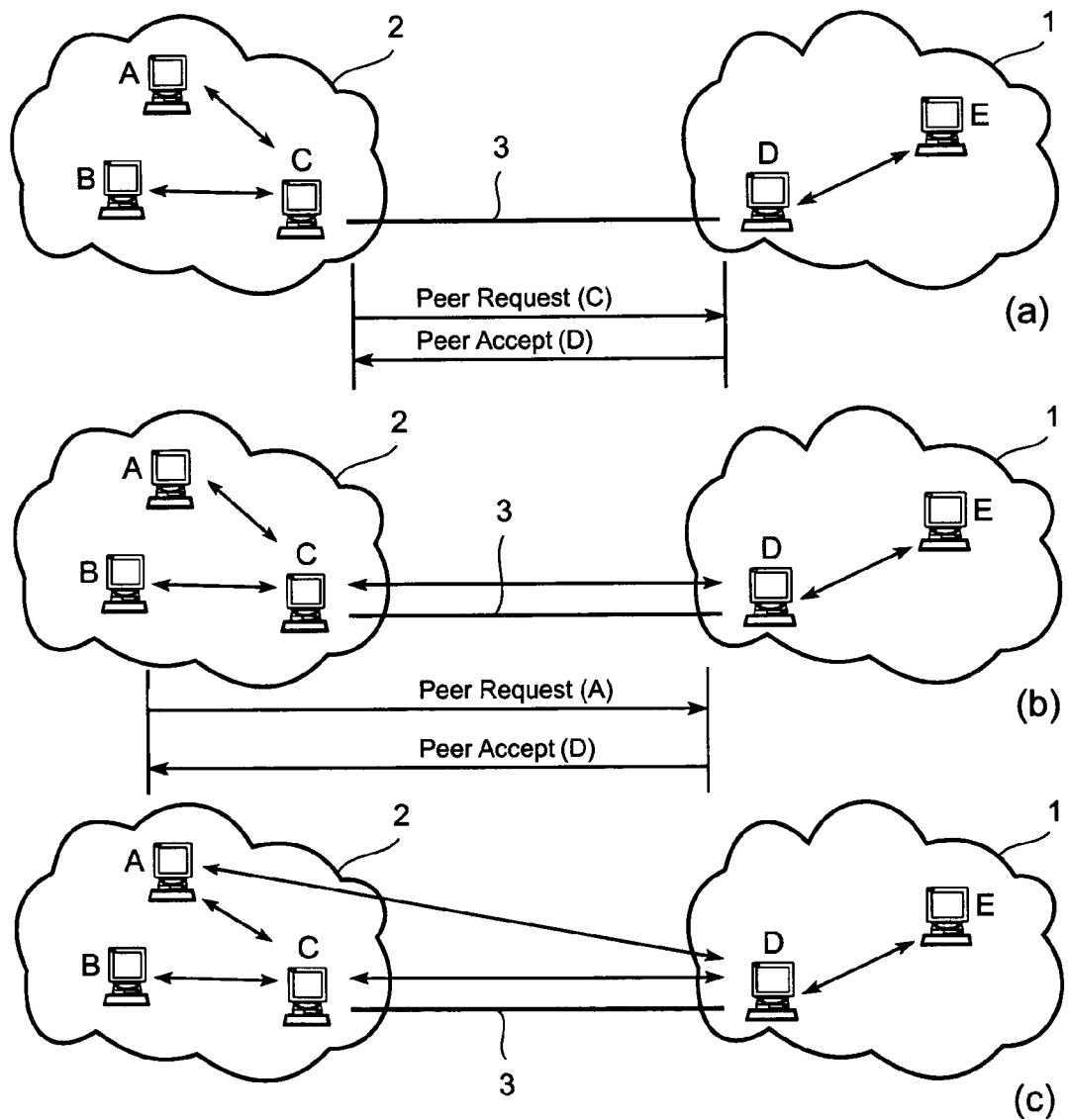
FIG. 1, a known way of establishing peer-to-peer connections over a network.
Figure 2:
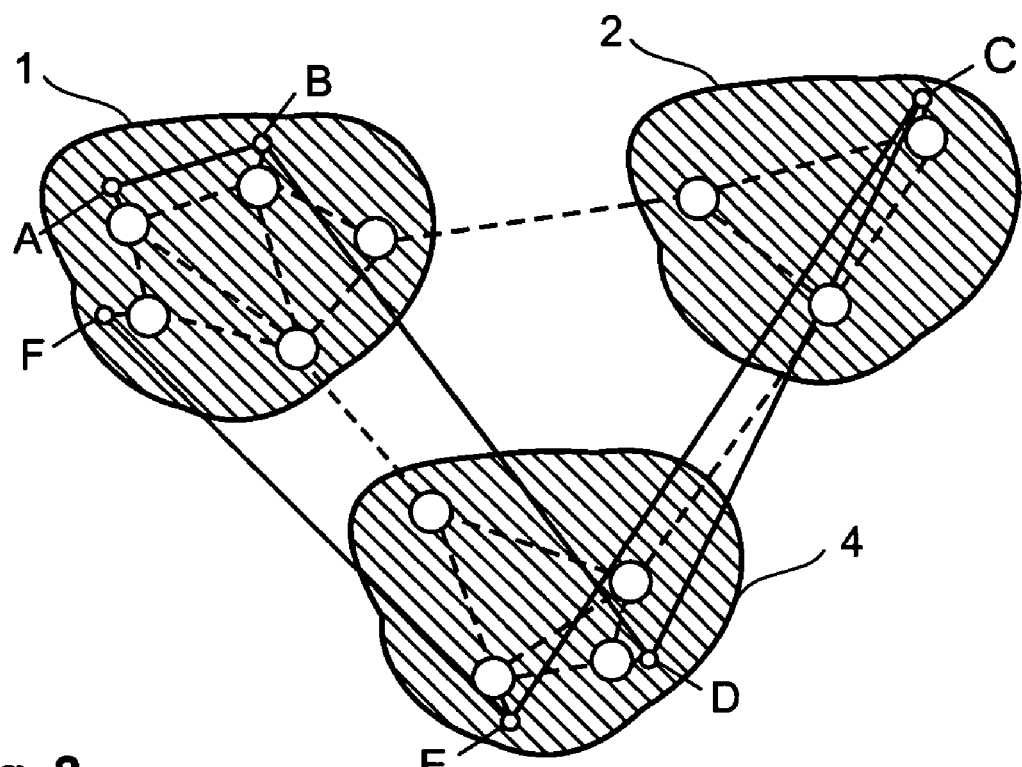
FIG. 2, a symbolic diagram of a network showing connections established according to a known peer-to-peer application, FIG. 3, a known way of querying information according to a known peer-to-peer application, FIG. 4 a), a diagram showing a network, in accordance with an embodiment of the present invention, FIG. 4 b), a block diagram of a network traffic control unit, in accordance with an embodiment of the present invention, FIG. 4 c), a flow chart of a method for controlling traffic on a network, in accordance with an embodiment of the present invention, FIG. 5, a diagram showing the way messages are exchanged, in accordance with an embodiment of the present invention, FIG. 6, a way of establishing peer-to-peer connections over a network, in accordance with an embodiment of the present invention, FIG. 7, another way of establishing peer-to-peer connections over a network, in accordance with an embodiment of the present invention, FIG. 8, a symbolic diagram of a network showing connections established, in accordance with an embodiment of the present invention, FIG. 9, a block diagram of a network, in accordance with an embodiment of the present invention, FIG. 10, a data structure a network traffic control unit provides as peering specific knowledge, in accordance with an embodiment of the present invention, FIG. 11, a flow chart showing a search for data files or services, in accordance with an embodiment of the present invention, and FIG. 12, a flow chart showing a method for updating peering specific knowledge.
Figure 3:
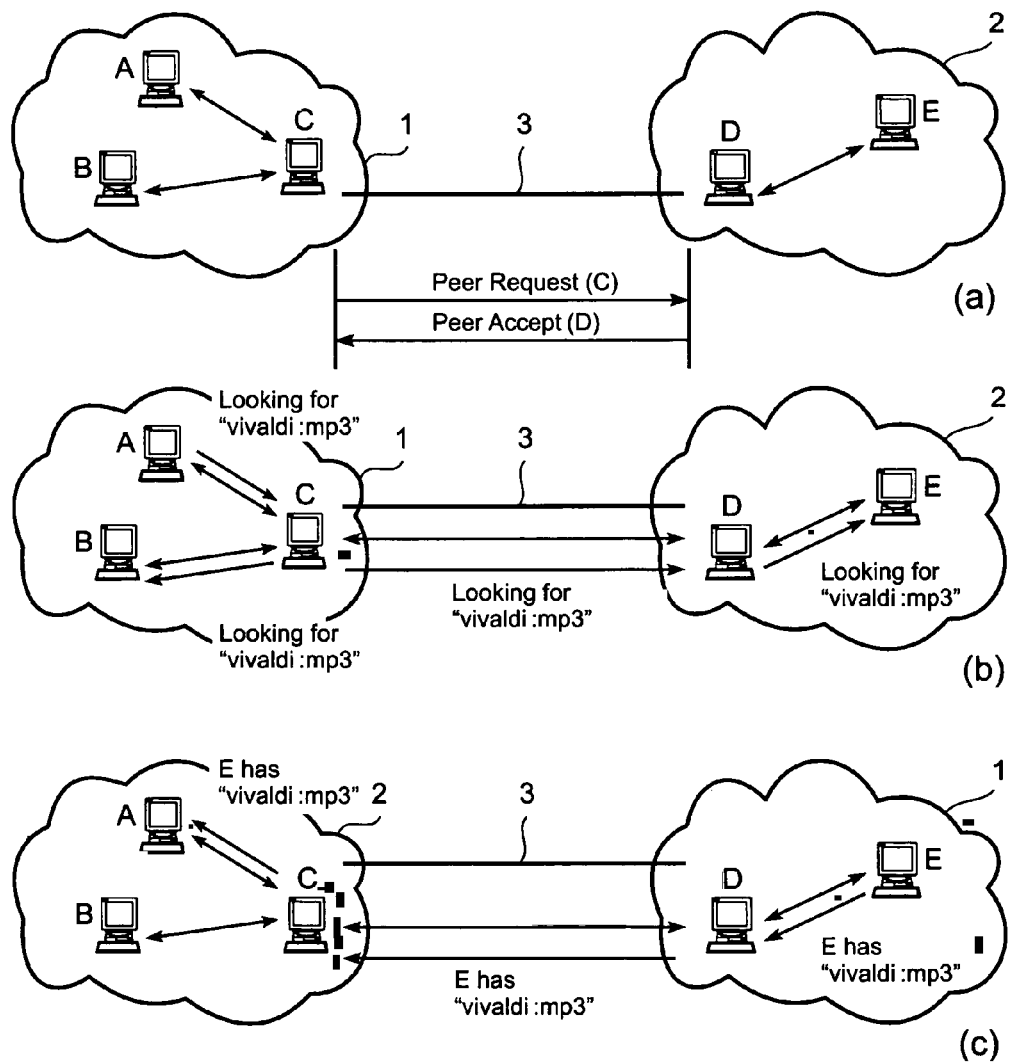
Figure 8:
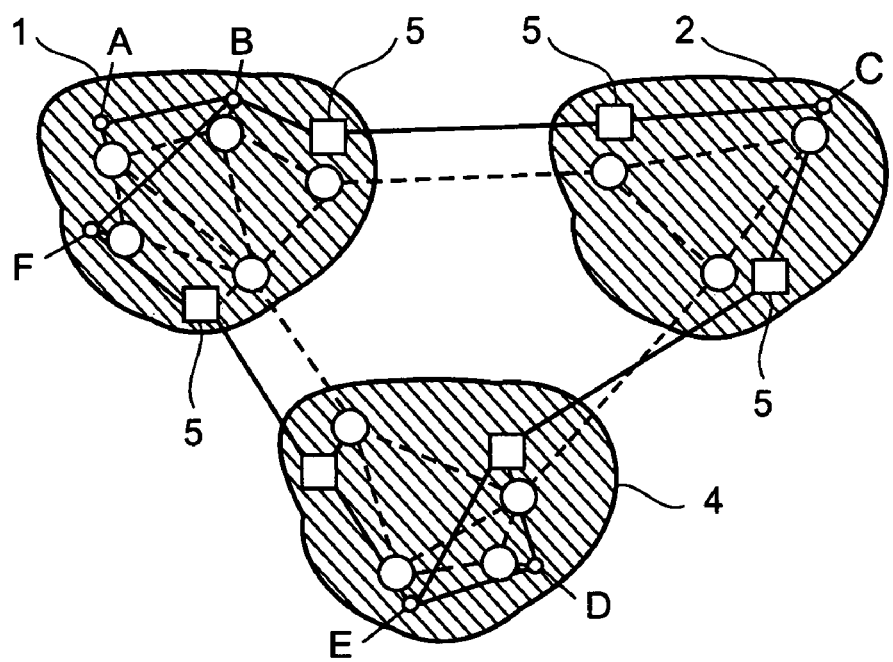

FIG. 8 illustrates a diagram of a network as an embodiment of the invention. Compared to the known network according to FIG. 2, now network traffic control units 5 are installed at ingress/egress nodes. They are exclusively responsible for establishing the overlay network which is indicated by straight lines. As can be derived from the diagram, there is only one connection between network traffic control units 5 of different clusters 1, 2, 4 established which reduces traffic tremendously. Also, peer A can now peer with peer F via peer B within cluster 1. This knowledge was provided and applied by the network traffic control units 5 while establishing connections and managing intercepted connect requests.

Figure 9:
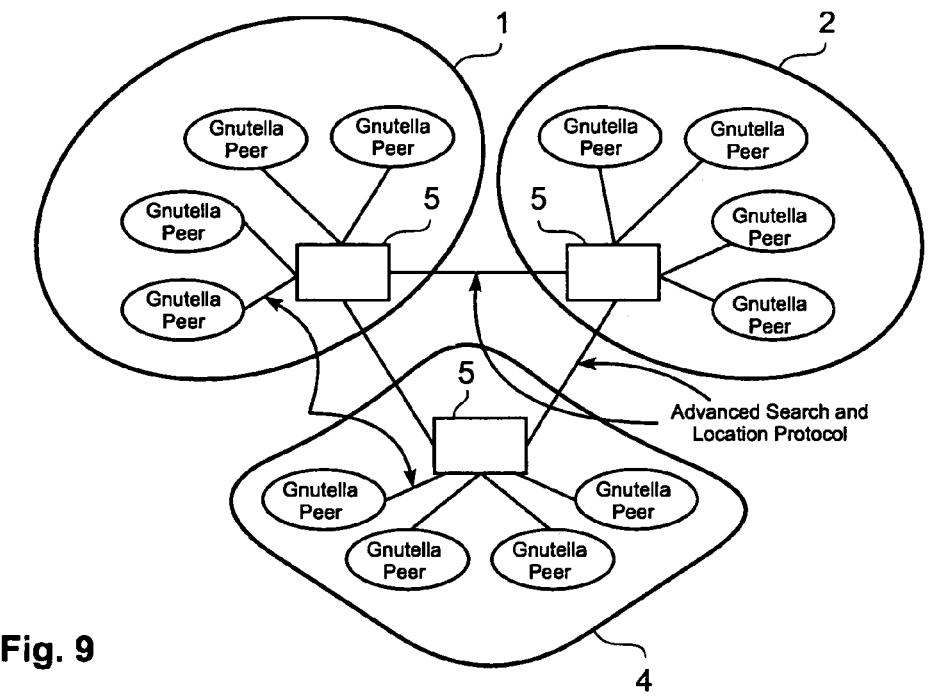

The scalability problems of unstructured peer-to-peer approaches can alternatively or in addition to be alleviated by replacing the brute-force searching (querying) with an intelligent data location mechanism. Thus, the network traffic control unit provides managing capabilities for managing query requests that are intercepted and analyzed. Again, the peers can remain unchanged whereas in the core of the network an advanced location mechanism is used. FIG. 9 shows a network according to an embodiment of the invention. The peers that are located within three peer groups 1, 2 and 4 are all named as Gnutella Peers, as in this embodiment the traffic related to Gnutella peer-to-peer application should be managed. The network traffic control units 5 are located such that each network traffic control unit 5 is associated with a peer group such that a network traffic control unit 5 has access to all sent or received messages the peers of his group are involved in when communicating to peers of other peer groups. With regard to physical network topology, network traffic control units typically sit between access and edge routers such that they may intercept peer-to-peer messages. Like this, a network traffic control unit serves a number of peers in its vicinity to which it is network close.

Among the network traffic control units 5 and especially for managing intercepted query requests in an intelligent low-traffic way, a protocol different to the peer-to-peer protocol is used in order to better match these new requirements. Such protocol may be named "Advanced Search and Location Protocol". The advantages of this approach are: In the core of the network, flooding is replaced by a scalable advanced location mechanism. This improves scalability and significantly reduces the amount of control traffic. The peers do not have to be replaced or changed. In particular, a highly dynamic peer population is supported. The network traffic control units 5 are relatively stable and thus fulfill the requirements of structured peer-to-peer systems. They protect the network from flooding messages and use an advanced location mechanism instead.

In the following, the architecture is explained using the Gnutella protocol as an example for a peer-to-peer application protocol. Other unstructured peer-to-peer approaches work similarly. The peers execute the Gnutella protocol to locate files and execute HTTP to download files. Network traffic control units also implement the Gnutella protocol in order to communicate with the peers. Unlike standard peers, network traffic control units do not participate in flooding Gnutella requests. Between network traffic control units, an advanced location mechanism is used.

A part of the control logic managing capabilities is preferably the application of a set of rules for translating the content of queries—and especially the strings of such queries representing the content—into keys. Keys are more easy to query and less vague in representing a statement than language is. In addition, keys are more short than strings and therefore need less bandwidth.

A given input string is first processed by a stop-word filter that removes all words that are insignificant for the search. A parser then generates a set of hash-codes—that are regarded as special implementation of keys using hash-functions—from the remaining words of the query. In the most simple case, the parser generates a single hash-code from each word. A sophisticated parser maps content to a hierarchical structure, for instance filetype="music"
    format="mp3"
    artist="vivaldi"
    conductor="karajan"

and allocates a key to this structure.

For each valid sub string of a query, additional keys might be computed. This allows to implement sub string queries. Details of how this could be achieved are described in "A Scalable Peer-to-Peer Architecture for Intentional Resource Discovery" by Magdalena Balazinska, et al., Pervasive 2002—International Conference on Pervasive Computing, August 2002, which is hereby incorporated by reference.

The resulting keys are used to retrieve information from a distributed key—peer index. The key—peer index is distributed among network traffic control units in a way that every network traffic control unit maintains only a part of the overall key—peer index. A single network traffic control unit is administering a limited number of keys. Such key—peer index maps peers that store the file the key is related to.

Figure 10:
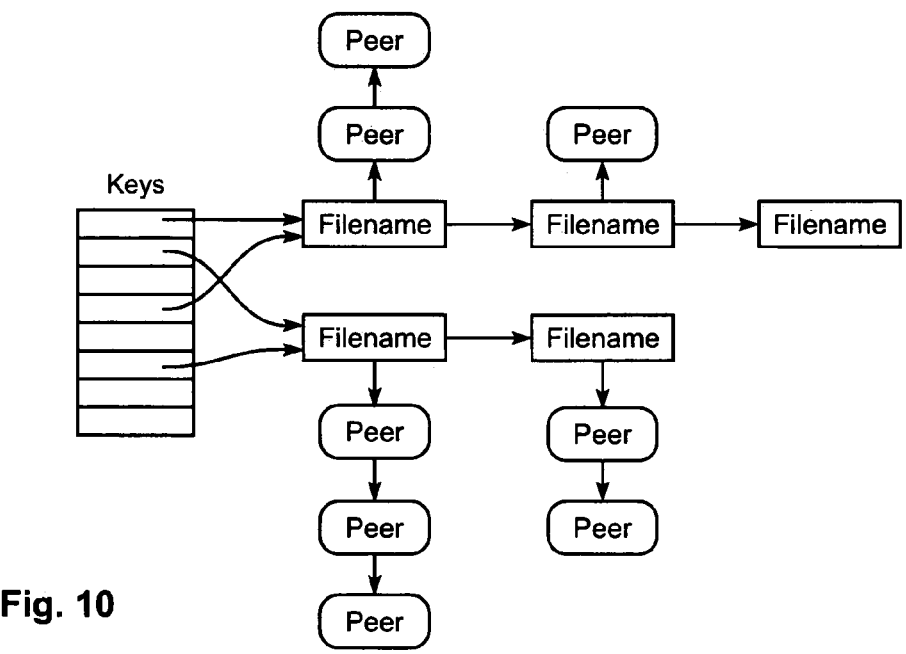

FIG. 10 illustrates data structure of such a key-peer index stored on a single network traffic control unit. The network traffic control unit keeps a fraction of the overall distributed key—peer index. A given key maps to none, one or more filenames and the corresponding file is stored on one or several peers.

Basic logic of managing queries that is implemented in the control logic of a network traffic control unit includes preferably:

For a given key, the control logic locates the network traffic control unit on which more information associated with this key are stored. There is preferably an index or a function available mapping keys to network traffic control units. A key and its associated information—especially peer and filename, and possibly the network traffic control unit that is associated to the peer—might be stored on multiple network traffic control units. In this case, the control logic locates the one which is closest to the requesting network traffic control unit. The key—network traffic control unit index is dynamic in the sense that new network traffic control units can be added and existing ones can be removed. Compared to the change rate of the peers, the change rate of the network traffic control units is expected two of magnitude lower.

The result of a key query is a list of filenames which are then returned to the peer that originally issued the query. Optionally these filenames may be compared by the network traffic control unit against the filenames extracted from the original query in order to produce a ranking list, which is then returned to the peer. Also, due to the inherent nature of generating keys and especially hashing there is always a non-null chance of two different inputs being mapped into the same key. This also might cause preference to double check, e.g. by way of comparing original filename and returned filename.

Figure 11:
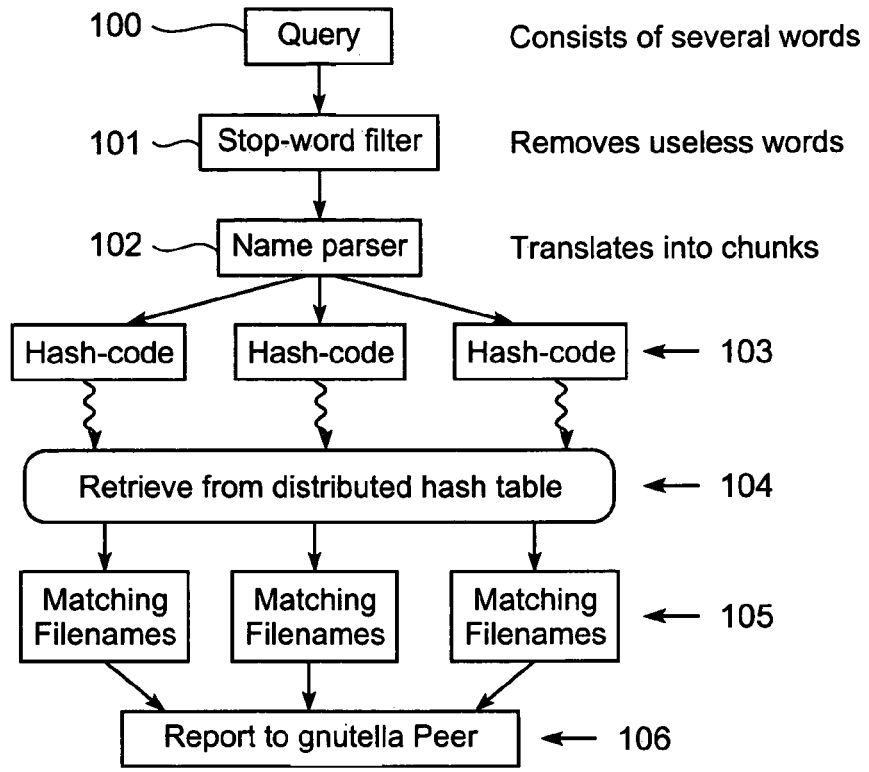

FIG. 11 illustrates a flow chart of managing a query request triggered by a peer that sends a query message 100. The network traffic control unit might be a peer and therefore receives the message or alternatively intercepts the message by diverting peer-to-peer traffic—here Gnutella traffic—from the network.

The network traffic control unit then proceeds as follows:

It computes a set of hash codes 103 based on the search string. For each valid sub string, a hash code is computed, too. This allows to implement sub string queries. Stop-word filter and name parser techniques are applied for generating the hash-codes, step 101, 102. These steps can of course have different order.

The network traffic control unit locates the destinations in terms of other network traffic control units where the derived hash-codes/keys are administered. This is achieved by means of a key—network traffic control unit index. A query message for the computed keys is sent from the managing network traffic control unit to the discovered remote network traffic control units. Upon reception of such message, the remote network traffic control unit will return values associated with the queried key, step 104. These values comprise of a list of Peers that store the requested file. For each peer, the associated network traffic control unit is also listed.

Whenever the specific keys are stored on the managing network traffic control unit, there is of course no need for contacting other network traffic control units and the peers that are associated to the queried keys can be detected on the local network traffic control unit.

The returned keys might be translated into strings and be compared to the original query string sent by the requesting peer, step 105.

If the list is not empty, then the managing network traffic control unit returns a hit message to the querying peer and gives itself as source, step 106. A peer might then be free to chose among the returned filenames and select any number of them for retrieval.

If either a push request or a HTTP get request arrives at the network traffic control unit, then the network traffic control unit selects the real data source—i.e. a specific peer—to retrieve the file from. As selection criteria it may use the quality of the network connection (delay, throughput, error rate, or other parameters that might be evaluated by the network traffic control units) and freshness of information. The network connection for retrieving is not offered to the offering peer but instead to its associated network traffic control unit, as the two network traffic control units are assumed to be correlated. In locality-aware DHT's, evaluation of the network connection is delivered without any additional overhead.

After the serving peer is chosen, the managing network traffic control unit starts retrieving the file from this peer via the associated network traffic control unit, then directly forwarding it to the querying peer.

In case an entry is not available—that might mean the peer that was listed as offering a file has disappeared or no longer has this file—an explicit removal procedure as described below is executed to disseminate this new information to the other network traffic control units. Also, the managing network traffic control unit may decide to retrieve from another—for example the next best—offering peer instead, or directly notifying the querying peer of the failed attempt.

Figure 12:
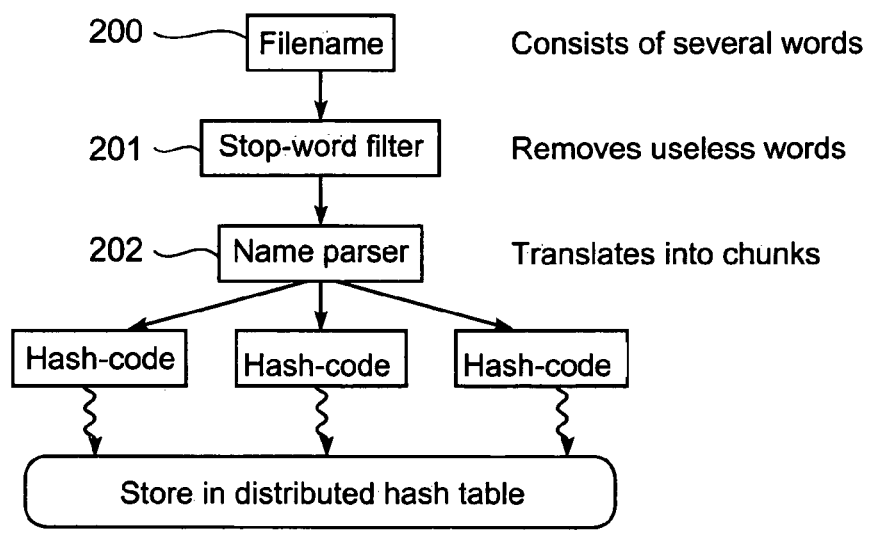

FIG. 12 depicts a flow chart for an insert operation that is based on monitoring hit messages that are forwarded through the network. The insert method is managed by the control logic of an network traffic control unit.

As soon as a network traffic control unit observes a hit answer according to the peer-to-peer application protocol that originates from one of its local peers a new entry in the distributed key—peer index has to be performed as follows:

The network traffic control unit computes a set of keys, step 201, 202 based on the filename 200. This computation is analogous to the one used for the search operation. For each key that is computed, the managing control logic identifies a network traffic control unit that is administering this key. If that key is not existing yet, it is assigned to one of the network traffic control units. The administering network traffic control units then stores the key together with the filename, the address of the peer as well as the IP address of the associated network traffic control unit.

A remove operation that also updates the key—peer index can include of an implicit and/or explicit part. Implicit removals occur if an index entry wasn't accessed for some time. Time outs are expected to be in the range of one or more hours. Implicit removals are done by each network traffic control unit individually by periodically checking entries that have timed out. Explicit removals occur when a download from an index entry did not succeed either because the file or the peer has disappeared. In this case, the index entry is removed on all network traffic control units that store the associated key.

The invention claimed is:

1. A method for controlling traffic on a network, comprising:

receiving messages related to peer-to-peer application, intercepted by a filter unit from a network line, irrespective of the messages' destination, managing a request represented by an intercepted message subject to its content and subject to peering specific information, wherein the request to be managed is a connect request issued from a peer node and directed to another peer node, dropping the intercepted message;

wherein managing the connect request is subject to existing connections a network traffic control unit is aware of the dropping of a plurality of intercepted messages, wherein no message is sent to the addressee of the intercepted connect request when a connection is already established that can serve or be extended to serve the requesting peer node, and further comprising:

sending a connect request to the originator of the intercepted connect request in response to the intercepted connect request;

sending a connect request to the addressee of the intercepted connect request;

sending a connect request to the addressee of the intercepted connect request pretending the originator of the intercepted connect request is sending the connect request;

sending a connect request to a peer node other than the addressee of the intercepted connect request;

sending a connect request to another network traffic control unit; and sending the connect request to another party than the originator of the intercepted connect request once the originator has accepted the connect request from the network traffic control unit directed to the originator, and wherein a request to be managed is a data file query issued by a peer node, wherein managing the query request is subject to an index that allocates keys representing data files for download to network traffic control units, wherein managing the query request is subject to an index that allocates peer nodes to keys, and further comprising:

deriving one or more keys from the content of the query_request;

directing a request to one or more remote network traffic control units that are allocated to the derived keys according to a key—network traffic control unit index;

receiving a list of peer nodes that are allocated to the keys, from a remote one of said network traffic control unit;

sending a hit message to a querying peer node;

administering a key—peer node index for some keys, and providing other network traffic control units on request with knowledge of which peer nodes are allocated to a requested key according to the key—peer node index, wherein administering the key—peer node index comprises removals of entries;

monitoring hit messages sent from an associated peer node, deriving one or more keys from content of a hit message, allocating a sending said peer node to the derived keys, and storing the key—peer node relation in a key—peer node index.

\* \* \* \* \*